(12) United States Patent
Yamamitsu et al.

(10) Patent No.: US 8,875,824 B1
(45) Date of Patent: Nov. 4, 2014

(54) RADIATOR GRILL

(71) Applicant: Komatsu Ltd., Tokyo (JP)

(72) Inventors: Hironori Yamamitsu, Hirakata (JP); Kazuki Kure, Kishiwada (JP); Hiroshi Nakagami, Hirakata (JP); Taira Ozaki, Ikoma (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/131,489

(22) PCT Filed: Sep. 20, 2013

(86) PCT No.: PCT/JP2013/075567
§ 371 (c)(1),
(2), (4) Date: Jan. 8, 2014

(51) Int. Cl.
*B60K 11/00* (2006.01)
*F28D 1/02* (2006.01)

(52) U.S. Cl.
CPC ...................... *F28D 1/02* (2013.01)
USPC ....................................................... 180/68.1

(58) Field of Classification Search
USPC ................................. 280/68.1–68.6
See application file for complete search history.

(56) References Cited

U.S. PATENT DOCUMENTS

| | | | | |
|---|---|---|---|---|
| 6,142,108 | A * | 11/2000 | Blichmann | 123/41.05 |
| 7,581,607 | B2 | 9/2009 | Moen et al. | |
| 7,766,111 | B2 * | 8/2010 | Guilfoyle et al. | 180/68.1 |
| 2011/0246023 | A1 * | 10/2011 | Lockwood et al. | 701/36 |
| 2012/0060776 | A1 * | 3/2012 | Charnesky et al. | 123/41.05 |
| 2013/0000999 | A1 | 1/2013 | Naito et al. | |
| 2013/0081888 | A1 * | 4/2013 | Charnesky et al. | 180/68.3 |
| 2013/0086839 | A1 * | 4/2013 | Klop | 49/1 |
| 2013/0092462 | A1 * | 4/2013 | Chinta | 180/68.1 |

FOREIGN PATENT DOCUMENTS

| | | |
|---|---|---|
| DE | 43 15 163 A1 | 11/1994 |
| JP | 6-174566 A | 6/1994 |
| JP | 7-195359 A | 8/1995 |
| JP | D1177833 S | 5/2003 |
| JP | 2003-205519 A | 7/2003 |
| JP | 2007-224677 A | 9/2007 |
| JP | 2012-192560 A | 10/2012 |
| JP | 5204911 B1 | 2/2013 |
| WO | 2012/081496 A1 | 6/2012 |
| WO | 2012/086521 A1 | 6/2012 |

OTHER PUBLICATIONS

The International Search Report for the corresponding international application No. For PCT/JP2013/075567, issued on Nov. 26, 2013.

* cited by examiner

*Primary Examiner* — John Walters
*Assistant Examiner* — James Triggs
(74) *Attorney, Agent, or Firm* — Global IP Counselors, LLP (57) ABSTRACT

A radiator grill is mounted on a work vehicle and includes a frame and a plate member. The plate member is supported by the frame and having a plurality of through-holes aligned in a first direction and a second direction orthogonal to the first direction. Each of the through-holes has a pair of circular parts aligned in the first direction, and an interconnecting part having a width in the second direction that is smaller than diameters of the circular parts, the interconnecting part interconnecting the circular parts. The through-holes are disposed alternately so that one of the circular parts of one of two adjacent ones of the through-holes adjacent to each other in the second direction is aligned with the interconnecting part of the other of the two adjacent ones of the through-holes in the second direction.

4 Claims, 9 Drawing Sheets

RADIATOR GRILL

CROSS-REFERENCE TO RELATED APPLICATIONS

This application is a U.S. National stage application of International Application No. PCT/JP2013/0075567, filed on Sep. 20, 2013.

BACKGROUND

1. Field of the Invention

The present invention relates to a radiator grill.

2. Background Information

A work vehicle such as a bulldozer is equipped with a radiator grill. A radiator grill is configured to allow an air flow that passes a radiator mounted in the work vehicle to pass through. For example, a radiator grill disclosed in Japanese Patent No. 5204911 has a lattice shape. Further, a radiator grill disclosed in Japanese Design Registration No. 1177833 has a plate member formed with a plurality of circular through-holes.

SUMMARY

In order to improve the cooling capacity of a radiator, the opening ratio of a radiator grill is preferably high from the point of view of reducing the flow resistance of the radiator air flow. In contrast, particles such as stones or fragments may scatter during work and collide with the body of the work vehicle. If the location of the collision is the radiator grill, the particles may pass through the radiator grill and strike the radiator behind the radiator grill. From this point of view, the opening ratio of the radiator grill is preferably small.

The abovementioned lattice-shaped radiator grill has a high opening ratio. Therefore, the cooling capacity of the radiator is high.

The plate-shaped radiator grill having the circular through-holes has a lower opening ratio than the lattice-shaped radiator grill. Therefore, the cooling capacity of the radiator is low.

An object of the present invention is to provide a radiator grill having a high opening ratio and a good radiator protective ability.

A radiator grill according to an aspect of the present invention is a radiator grill mounted on a work vehicle and includes a frame and a plate member. The plate member has a plurality of through-holes and is supported by the frame. The plurality of through-holes are aligned in a first direction and in a second direction orthogonal to the first direction. Each of the through-holes has a pair of circular parts aligned in the first direction and an interconnecting part that interconnects the pair of circular parts. The interconnecting part has a width in the second direction that is smaller than the diameter of the circular parts. The plurality of through-holes are disposed alternately so that the circular part of one through-hole among a pair of through-holes adjacent to each other in the second direction is aligned with the interconnecting part of the other through-hole in the second direction.

In this case, the radiator protective ability is good since the radiator grill is configured by the plate member. Moreover, an opening ratio can be improved in comparison to a case in which a plurality of circular through-holes are provided since the through-holes with the above shape are disposed in an alternating manner. Therefore, the radiator grill according to the present aspect is able to achieve a high opening ratio and a good radiator protective ability.

The radiator grill preferably is further equipped with a guide plate. The guide plate is disposed facing the back surface of the plate member, and extends in the second direction. The guide plate is inclined with respect to the normal direction of the plate member. In this case, the flow of air passing through the through-holes is guided by the guide plate.

The circular part of one through-hole among the pair of through-holes adjacent to each other in the second direction overlaps a tangent line that is parallel to the first direction and that is tangent to a pair of circular parts of the other through-hole. In this case, the opening ratio can be improved since the through-holes are disposed densely.

The work vehicle according to another aspect of the present invention includes the above radiator grill.

A radiator grill according to one aspect of the present invention is able to realize a high opening ratio and a good radiator protective ability.

DETAILED DESCRIPTION OF EMBODIMENTS

Figure 1:
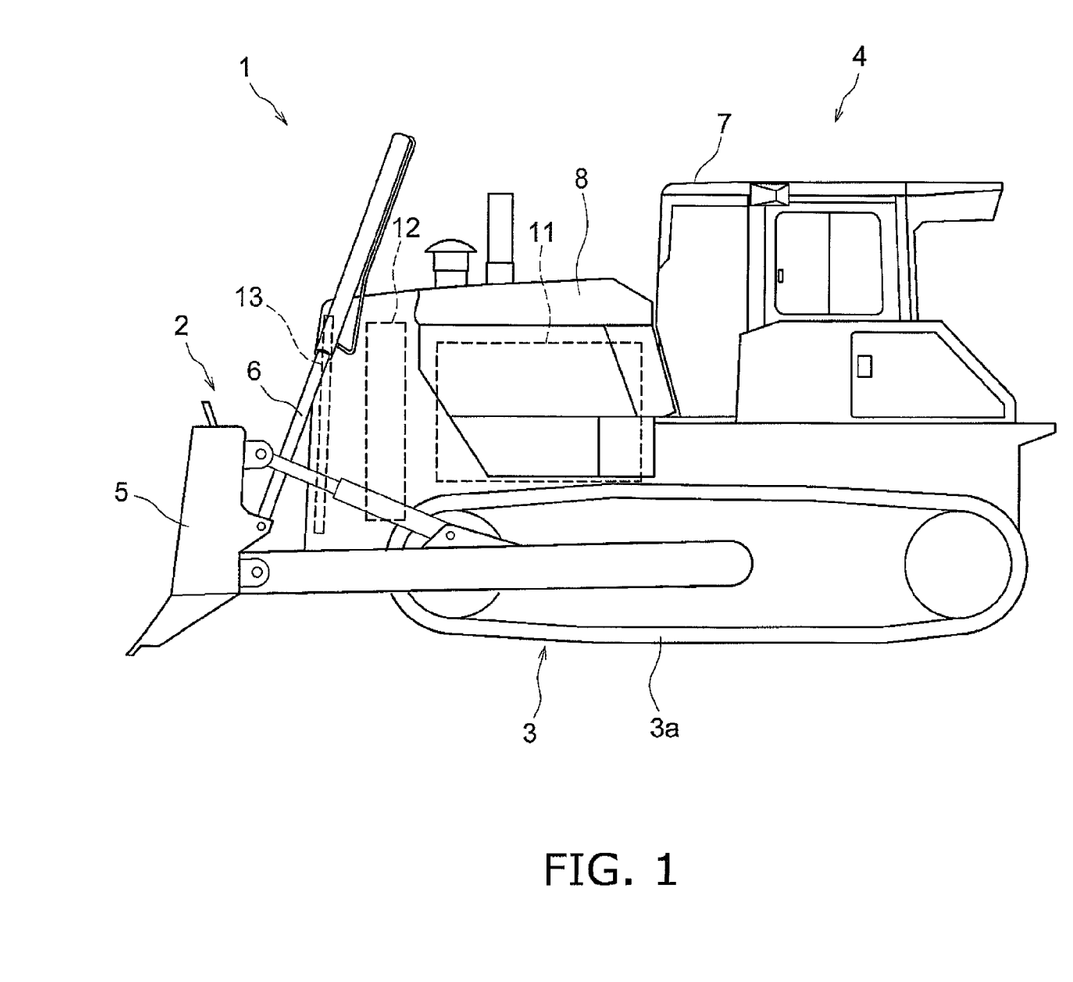
FIG. 1 is side view of a work vehicle.

The following is a description of a work vehicle according to the present embodiment with reference to the drawings. FIG. 1 is a side view of the work vehicle 1 according to the present embodiment. A work vehicle 1 is a bulldozer. The work vehicle 1 is equipped with working implement 2, a travel device 3, and a vehicle body 4. The travel device 3 is a device for allowing the vehicle to travel and includes a crawler track 3a. The work vehicle 1 travels due to the crawler track 3a being driven.

The vehicle body 4 includes a cab 7 and an engine compartment 8. The engine compartment 8 is disposed in front of the cab 7. In the present embodiment, front, rear, left, and right refer to the front, rear, left, and right directions as seen from an operator inside the cab 7.

The working implement 2 is provided in front of the engine compartment 8. The working implement 2 includes a blade 5 and hydraulic cylinders 6. The blade 5 is provided in a manner that allows for pivoting in the vertical direction. The hydraulic cylinders 6 change the attitude of the blade 5.

An engine 11 and a radiator 12 are included inside the engine compartment 8. The radiator 12 cools cooling liquid for the engine 11. The radiator 12 is disposed in front of the engine 11. A radiator grill 13 is disposed on the front surface of the engine compartment 8. The radiator grill 13 is disposed in front of the radiator 12. An air flow that passes the radiator 12 and is blown to the outside of the work vehicle 1 passes through the radiator grill 13.

Figure 2:
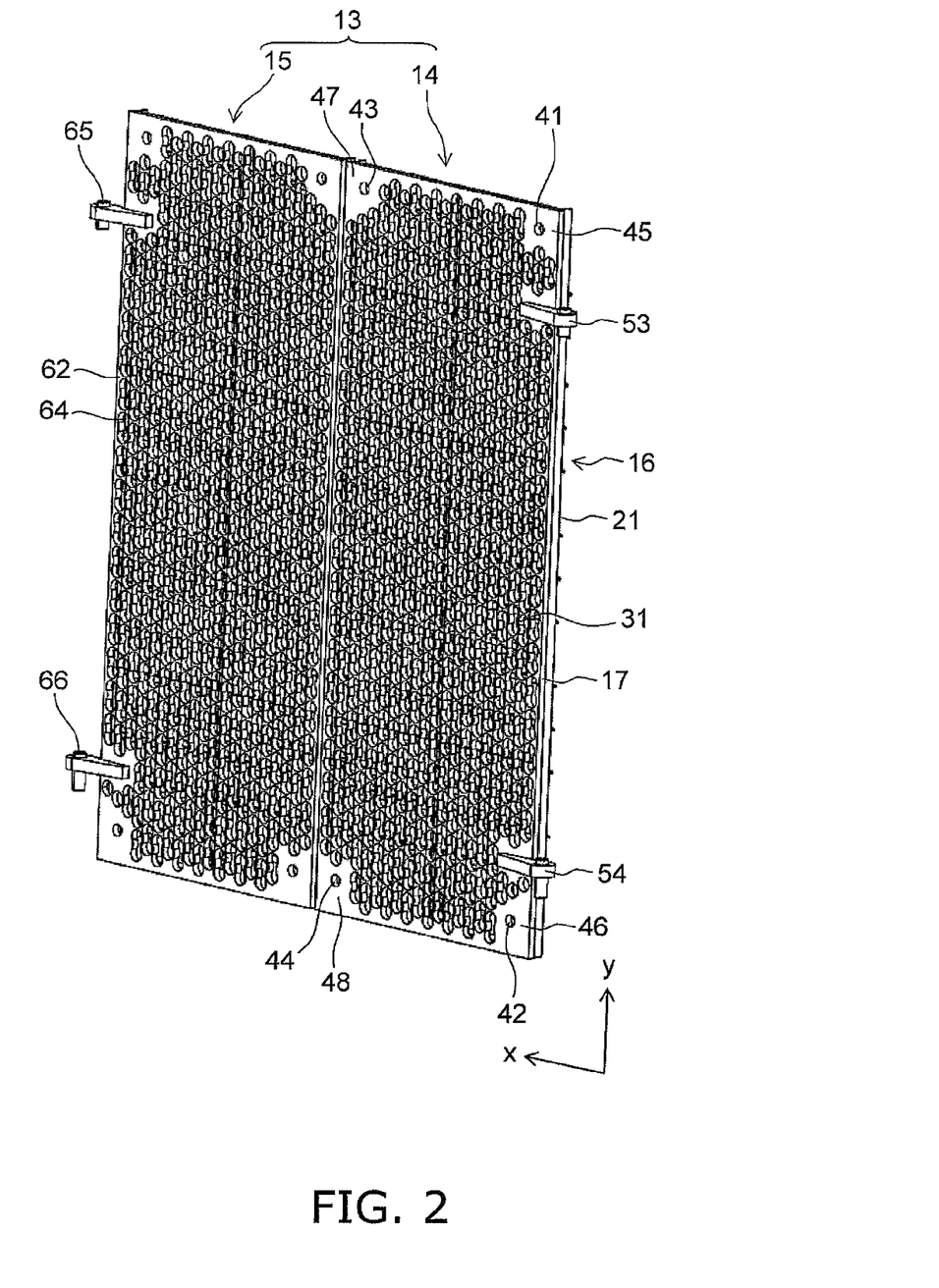
FIG. 2 is a perspective view of a radiator grill.
Figure 3:
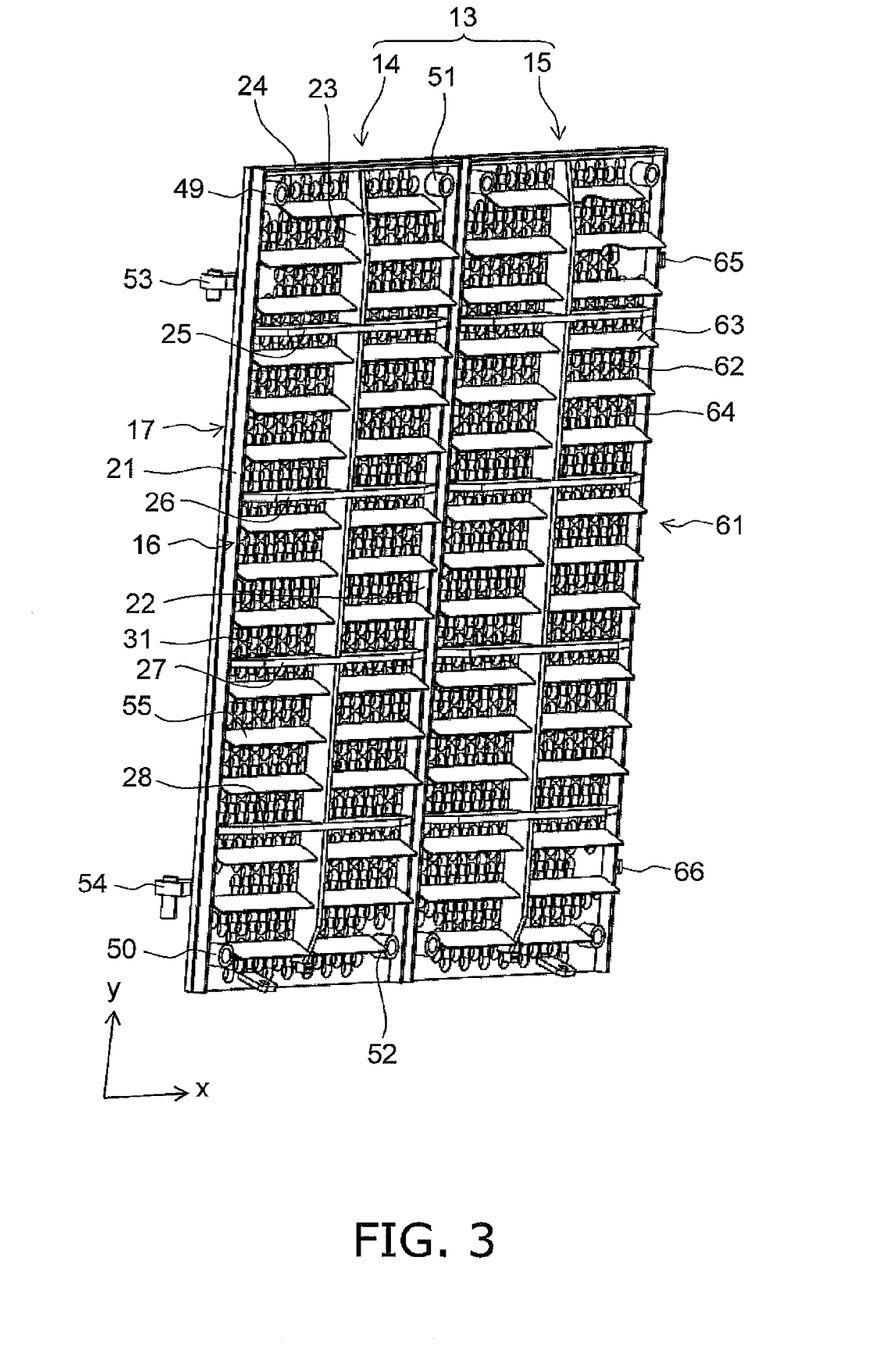
FIG. 3 is a perspective view of the radiator grill.
Figure 4:
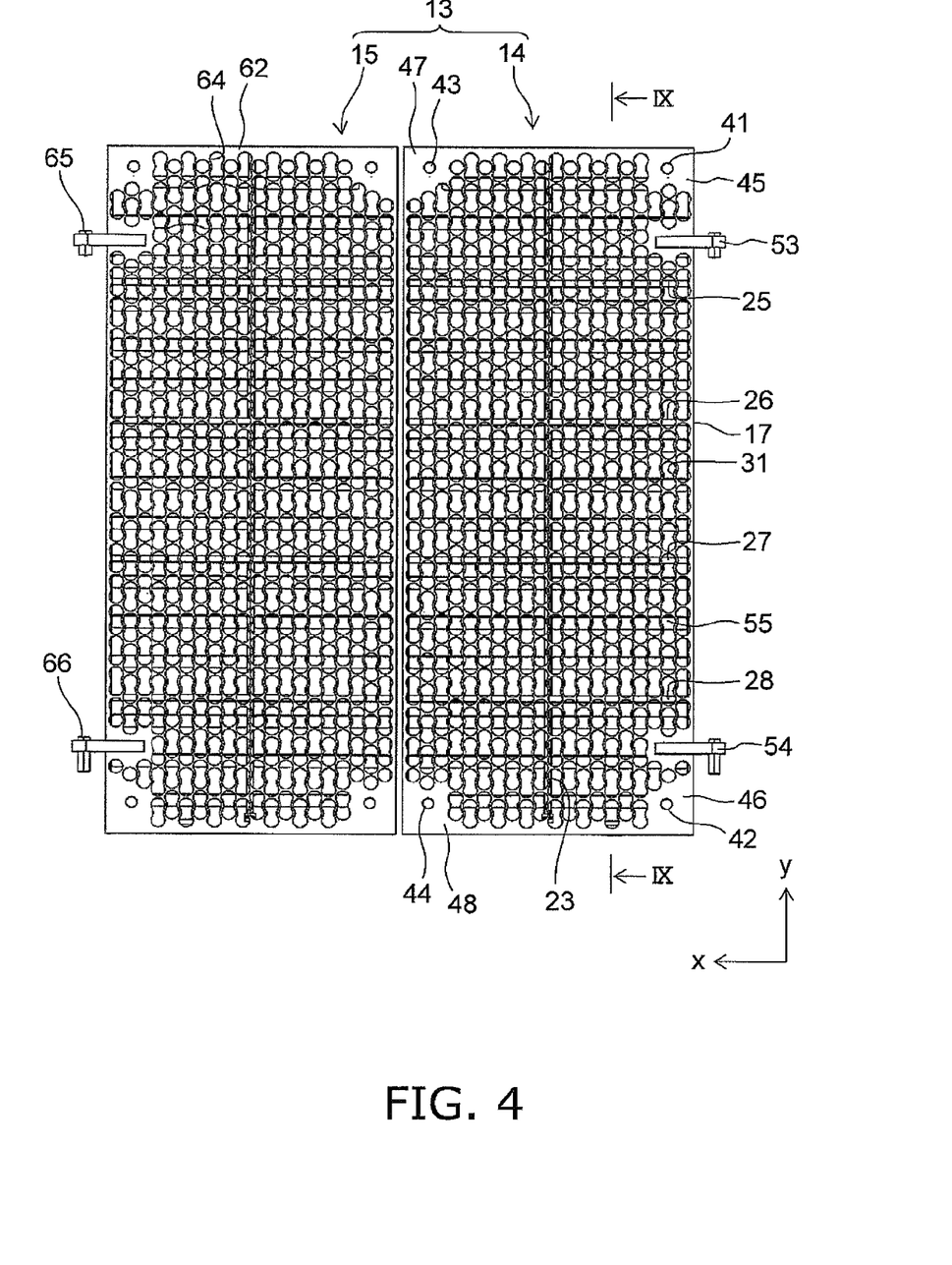
FIG. 4 is a front view of the radiator grill.
Figure 5:
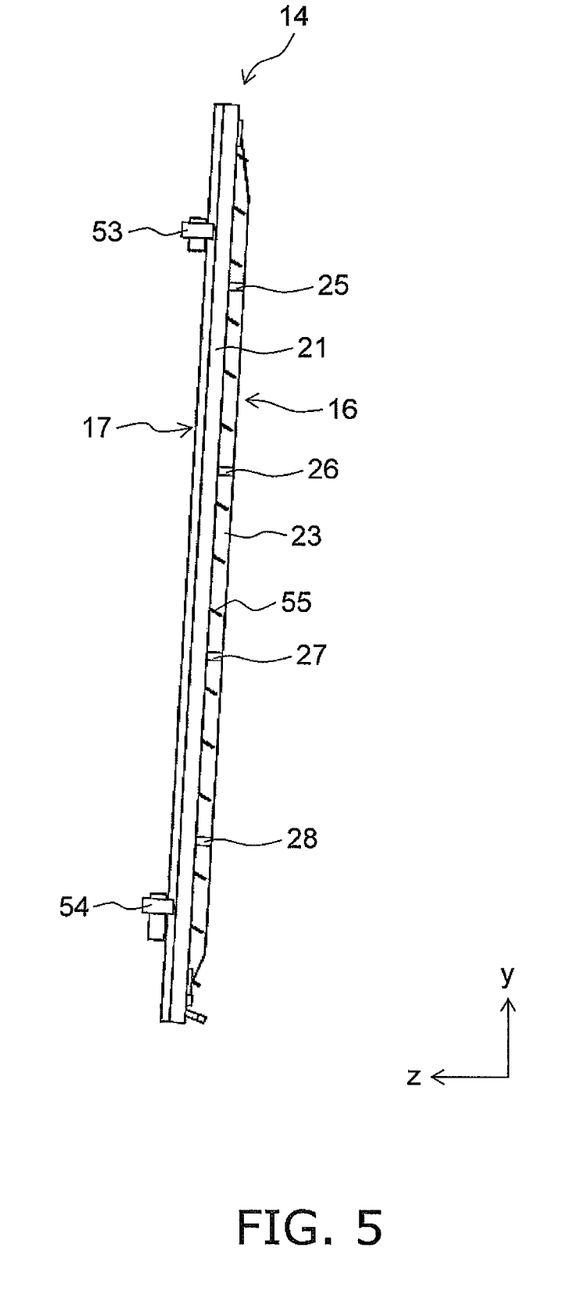
FIG. 5 is a side view of the radiator grill.
Figure 6:
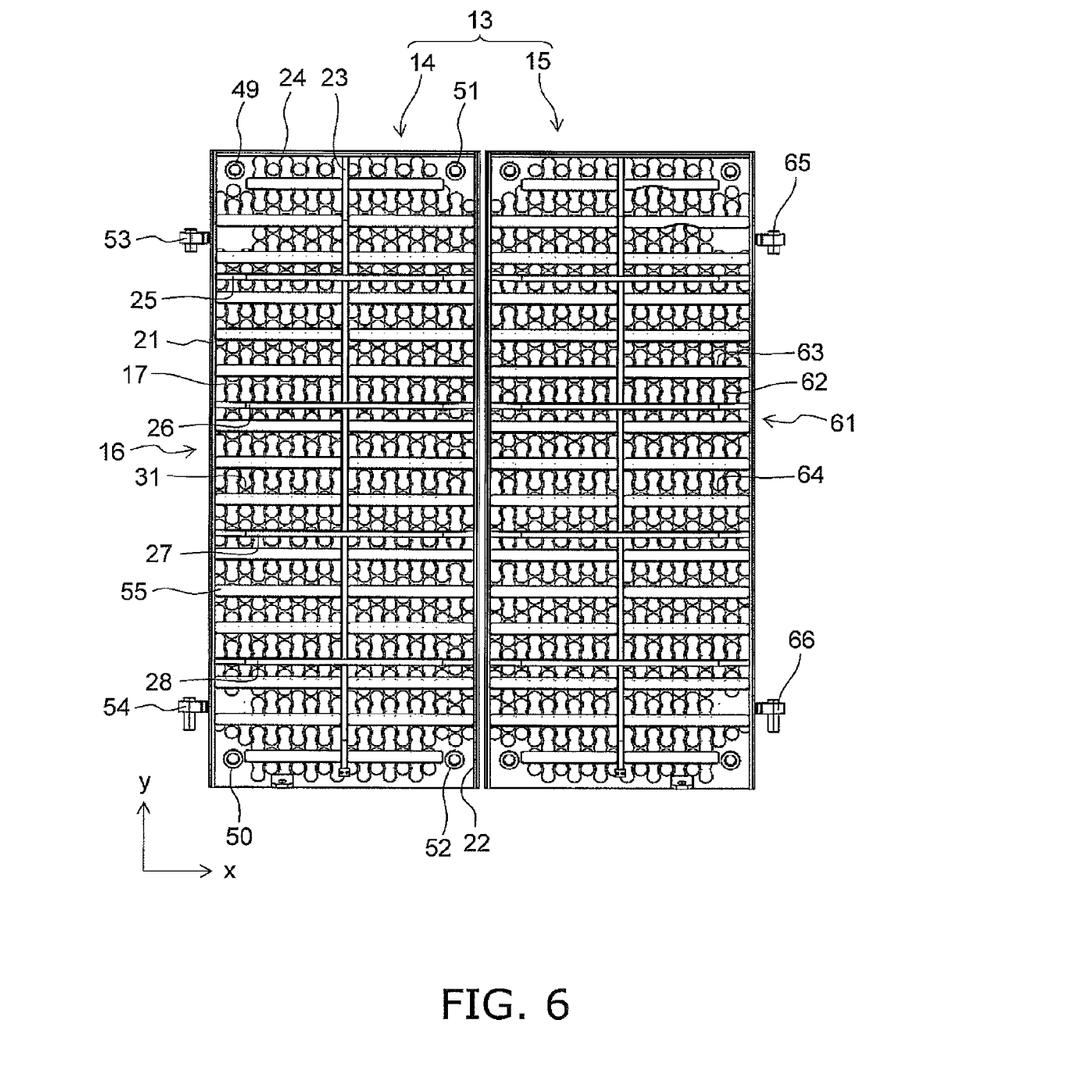
FIG. 6 is a rear view of the radiator grill.

FIG. 2 is a perspective view of the radiator grill 13 as seen diagonally from the front. FIG. 3 is a perspective view of the radiator grill 13 as seen diagonally from the rear. FIG. 4 is a front view of the radiator grill 13. FIG. 5 is a side view of the radiator grill. FIG. 6 is a back surface view of the radiator grill 13. As illustrated in FIGS. 2 to 6, the radiator grill 13 includes a first radiator grill 14 and a second radiator grill 15. The first radiator grill 14 and the second radiator grill 15 are separate members and are disposed in a row on the left and right of each other. The first radiator grill 14 and the second radiator grill 15 each have a shape that substantially has left-right symmetry.

The first radiator grill 14 has a first frame 16 and a first plate member 17. The first frame 16 supports the first plate member 17. The first frame 16 is attached to the rear surface of the first plate member 17. The first plate member 17 is a thick metal plate and preferably has a thickness of, for example, 10 mm or more to 20 mm or less.

As illustrated in FIG. 3, the first frame 16 has a first vertical member 21 and a second vertical member 22. The first vertical member 21 and the second vertical member 22 are arranged away from each other in the horizontal direction. The first vertical member 21 and the second vertical member 22 both extend in the vertical direction.

The vertical direction refers to the up and down direction along the surface of the first plate member 17 of the first radiator grill 14. The horizontal direction refers to the left and right direction along the surface of the first plate member 17 of the first radiator grill 14.

In the present embodiment, when the radiator grill 13 is attached to the vehicle body 4 as illustrated in FIG. 1, the radiator grill 13 is inclined in the up-down direction and thus the vertical direction of the radiator grill 13 does not match the up-down direction of the work vehicle 1 and is a direction that is inclined with respect to the up-down direction of the work vehicle 1. The vertical direction of the radiator grill 13 may match the up-down direction of the work vehicle 1 when the radiator grill 13 is attached to the work vehicle 1.

The first frame 16 has an intermediate vertical member 23. The intermediate vertical member 23 extends in the vertical direction and is disposed between the first vertical member 21 and the second vertical member 22. The first frame 16 has a plurality of lateral members 24 to 28. The plurality of lateral members 24 to 28 extend in the horizontal direction and couple the first vertical member 21 and the second vertical member 22. The plurality of lateral members 24 to 28 are disposed away from each other in the vertical direction.

As illustrated in FIG. 4, the first plate member 17 has a plurality of through-holes 31 aligned in a first direction (y) and a second direction (x). The second direction (x) is orthogonal to the first direction (y). In the present embodiment, the first direction (y) is the vertical direction. The second direction (x) is the horizontal direction. In the drawings, the first direction indicates the y-axis, the second direction indicates the x-axis, and a normal direction of the first plate member 17 indicates the z-axis.

Figure 7:
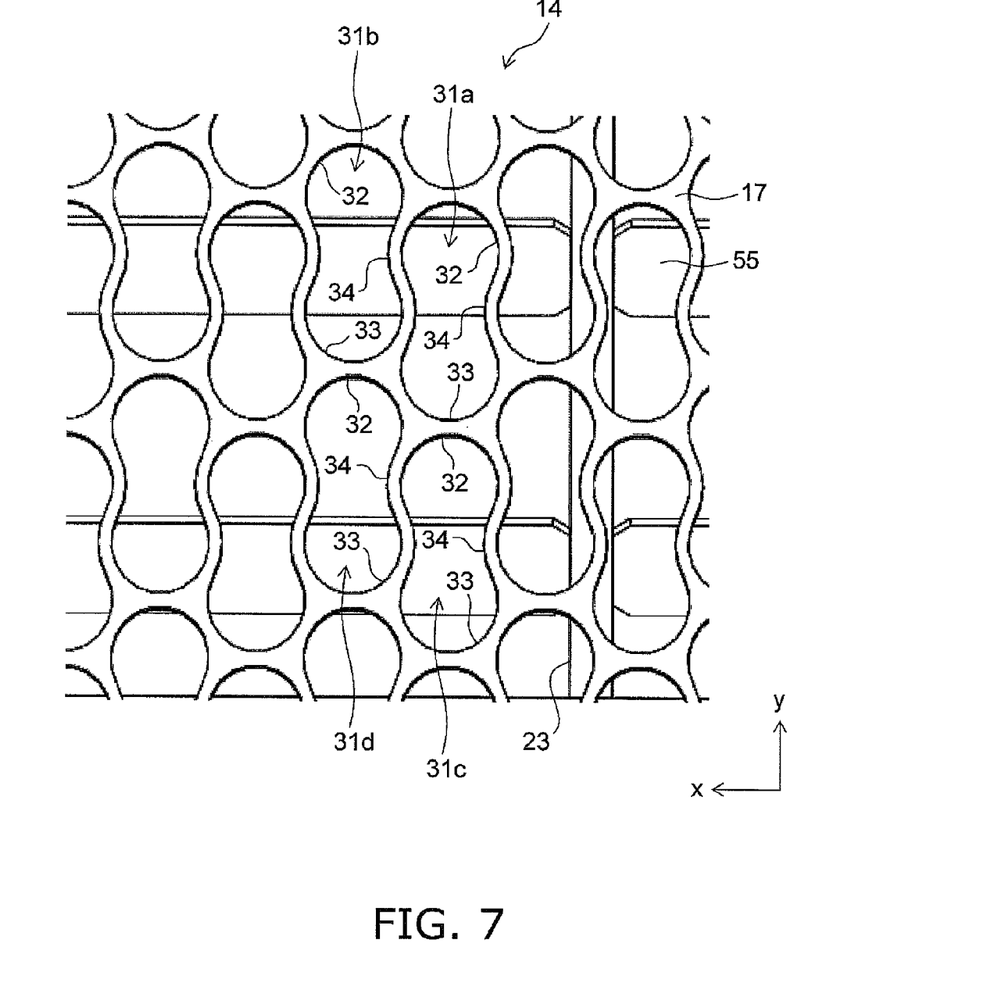
FIG. 7 is an enlarged front view of the radiator grill.

FIG. 7 is an enlarged front view of the radiator grill 13. As illustrated in FIG. 7, one through-hole 31 is referred to as a first through-hole 31a. The first through-hole 31a has a dumbbell shape. Specifically, the first through-hole 31a has a pair of circular parts 32 and 33 that are aligned in the first direction (y), and an interconnecting part 34 that interconnects the pair of circular parts 23 and 33. The interconnecting part 34 has a width in the second direction (x) that is smaller than the diameters of circular parts 32 and 33. In other words, the first through-hole 31a has a shape in which a long slot in the first direction (y) becomes narrower in the middle part in the first direction (y). Other through-holes 31 have the same shape as the first through-hole 31a.

The plurality of through-holes 31 are disposed alternately so that the circular part of one through-hole 31 among a pair of through-holes 31 adjacent to each other in the second direction (x) is aligned with the interconnecting part of the other through-hole 31 in the second direction (x). For example, as illustrated in FIG. 7, a through-hole 31 adjacent to the first through-hole 31a in the second direction (x) is referred to as a second through-hole 31b. A through-hole 31 adjacent to the first through-hole 31a in the first direction (y) is referred to as a third through-hole 31c. A through-hole 31 adjacent to the second through-hole 31b in the first direction (y) and adjacent to the third through-hole 31c in the second direction (x) is referred to as a fourth through-hole 31d. Specifically, through-holes 31 adjacent to each other in the first direction (y) and the second direction (x) are referred to as the first through-hole 31a, the second through-hole 31b, the third through-hole 31c, and the fourth through-hole 31d.

The first through-hole 31a has a first circular part 32, a second circular part 33, and an interconnecting part 34. The first circular part 32 and the second circular part 33 are aligned in the first direction (y). The interconnecting part 34 is positioned between the first circular part 32 and the second circular part 33 and interconnects the first circular part 32 and the second circular part 33. The second through-hole 31b has a first circular part 32, a second circular part 33, and an interconnecting part 34 in the same way as the first through-hole 31a.

The first circular part 32 of the first through-hole 31a is aligned with the interconnecting part 34 of the second through-hole 31b in the second direction (x). The second circular part 33 of the second through-hole 31b is aligned with the interconnecting part 34 of the first through-hole 31a in the second direction (x).

The third through-hole 31c has a first circular part 32, a second circular part 33, and an interconnecting part 34 in the same way as the first through-hole 31a. The fourth through-hole 31d has a first circular part 32, a second circular part 33, and an interconnecting part 34 in the same way as the first through-hole 31a.

The first circular part 32 of the third through-hole 31c is aligned with the interconnecting part 34 of the fourth through-hole 31d in the second direction (x). The second circular part 33 of the fourth through-hole 31d is aligned with the interconnecting part 34 of the third through-hole 31c in the second direction (x).

The second circular part 33 of the first through-hole 31a is aligned with a part between the second through-hole 31b and the fourth through-hole 31d in the second direction (x). The first circular part 32 of the fourth through-hole 31d is aligned with a part between the first through-hole 31a and the third through-hole 31c in the second direction (x).

Figure 8:
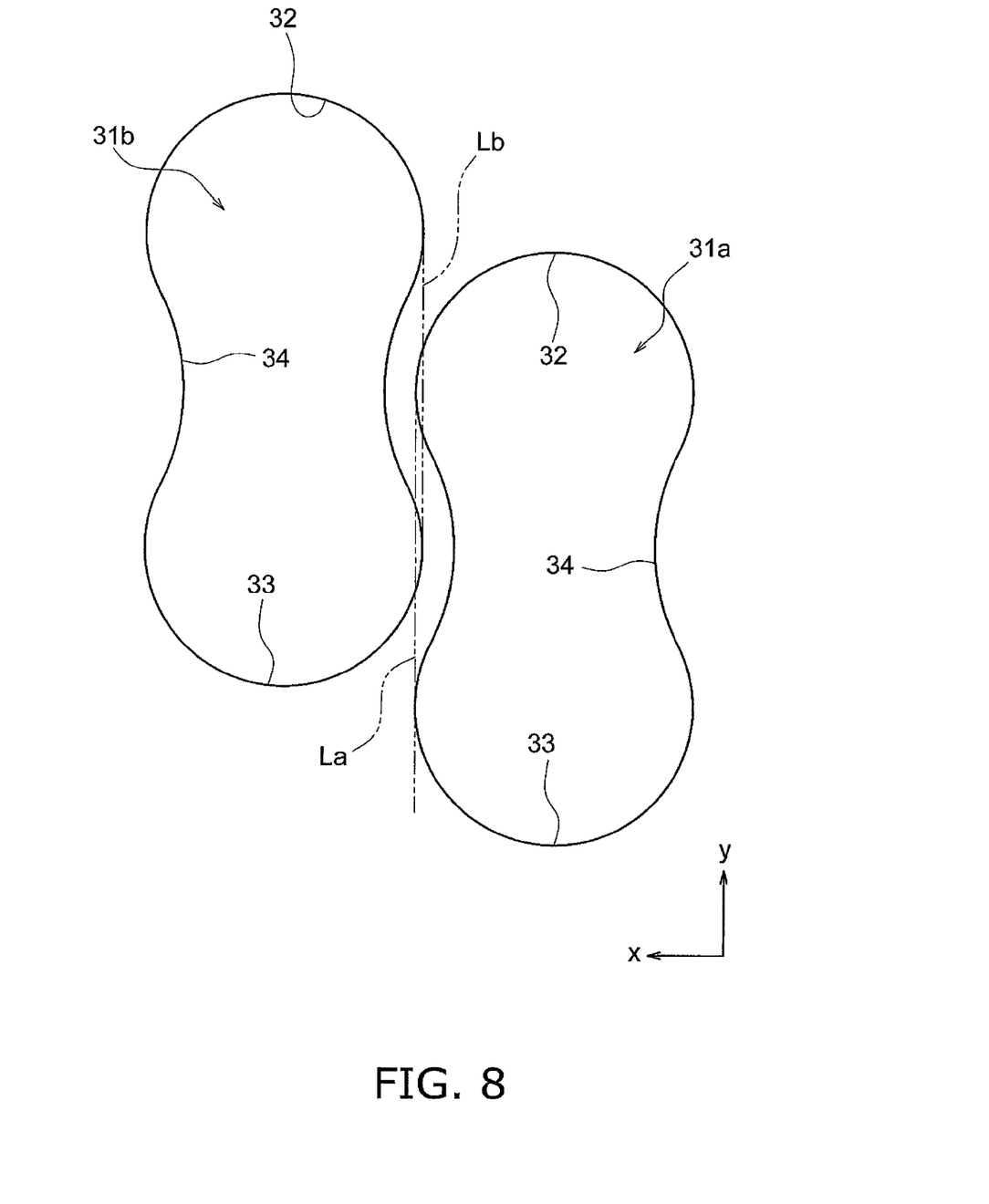
FIG. 8 is an enlarged illustration of through-holes of the radiator grill.

FIG. 8 is an enlarged view of the first through-hole 31a and the second through-hole 31b. As illustrated in FIG. 8, the first through-hole 31a and the second through-hole 31b are disposed near each other. Specifically, a tangent line La that is parallel to the first direction (y) and that touches (tangent to) the first circular part 32 and the second circular part 33 of the first through-hole 31a overlaps the second circular part 33 of the second through-hole 31b as seen from the front. A tangent line Lb that is parallel to the first direction (y) and touches (tangent to) the first circular part 32 and the second circular part 33 of the second through-hole 31b overlaps the first circular part 32 of the first through-hole 31a.

As illustrated in FIGS. 2 and 4, the first plate member 17 has a plurality of attachment holes 41 to 44. In the present embodiment, the first plate member 17 has four attachment holes 41 to 44. The first plate member 17 has a rectangular shape as seen from the front, and the attachment holes 41 to 44 are provided in the corners of the first plate member 17. Reinforcement parts 45 to 48 that are not formed with through-holes 31 are provided around the attachment holes 41 to 44 in the first plate member 17. As illustrated in FIGS.

3 and 6, bosses 49 to 52 are provided at the back surface of the respective attachment holes 41 to 44. The first radiator grill 14 is fixed to the vehicle body 4 by inserting fixing members such as bolts into holes in the bosses 49 to 52 and the attachment holes 41 to 44.

As illustrated in FIGS. 1 to 6, the first radiator grill 14 has a plurality of hinge parts 53 and 54. The hinge parts 53 and 54 are attached to the vehicle body 4 in a manner that allows the first radiator grill 14 to rotate around a certain rotational axis. In the present embodiment, the first radiator grill 14 has a first hinge part 53 and a second hinge part 54. The first hinge part 53 and the second hinge part 54 are disposed away from each other in the first direction (y). The first hinge part 53 and the second hinge part 54 are attached to the first plate member 17. The first hinge part 53 and the second hinge part 54 are both attached to the vehicle body 4 in a manner that allows the first radiator grill 14 to rotate around a rotational axis that extends in the first direction (y).

Figure 9:
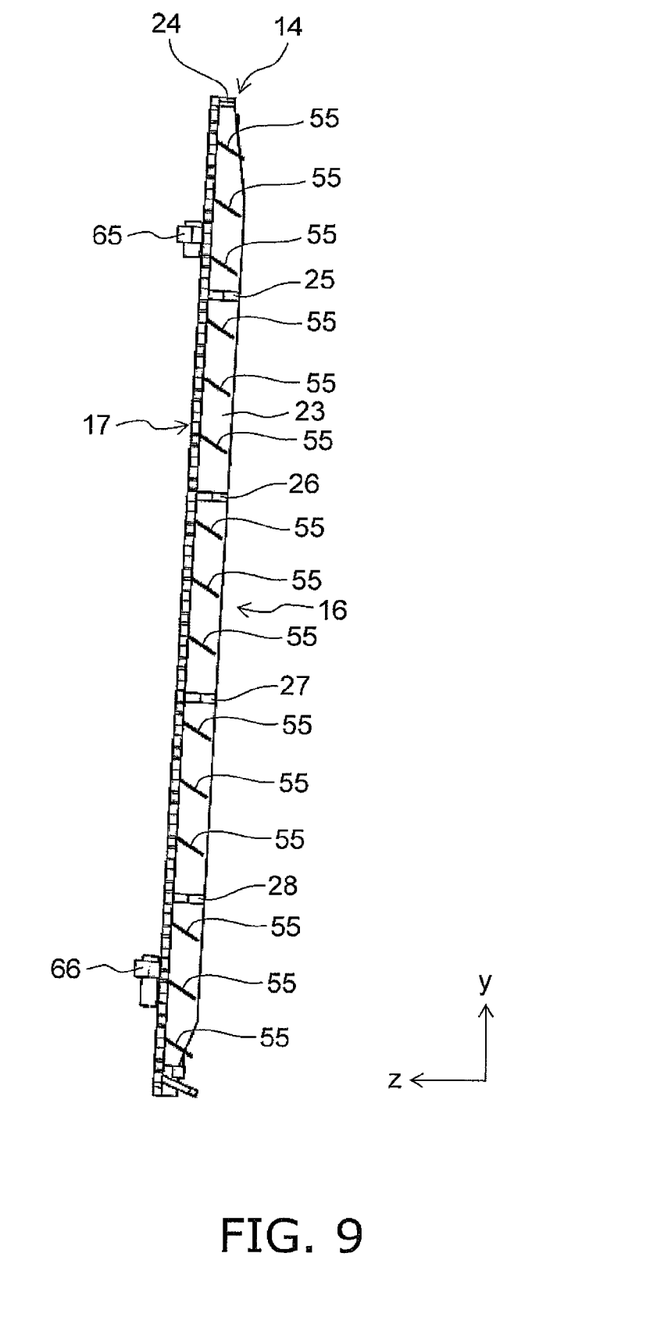
FIG. 9 is a cross-sectional view along line IX-IX in FIG. 4.

As illustrated in FIGS. 3 and 6, the first radiator grill 14 has a plurality of first guide plates 55. In the drawings, only a portion of the plurality of first guide plates 55 are provided with the reference numeral 55. The plurality of first guide plates 55 are disposed facing the back surface of the first plate member 17. The first guide plates 55 extend in the second direction (x). FIG. 9 is a cross-sectional view along line IX-IX in FIG. 4. As illustrated in FIG. 9, the first guide plates 55 are inclined with respect to the normal direction (z) of the first plate member 17. In the present embodiment, the first guide plates 55 are inclined diagonally upward.

As illustrated in FIGS. 3 and 6, the second radiator grill 15 has a second frame 61 and a second plate member 62. The second frame 61 is supported by the second plate member 62. The second plate member 62 has a plurality of through-holes 64 in the same way as the through-holes 31 of the first plate member 17. The second radiator grill 15 has hinge parts 65 and 66 in the same way as the hinge parts 53 and 54 of the first radiator grill 14. The second radiator grill 15 has a plurality of second guide plates 63. Since the second radiator grill 15 has a structure similar to the first radiator grill 14 except for the left-right symmetry, a detailed explanation will be omitted.

The radiator grill 13 according to the present embodiment has the following features.

Since the radiator grill 13 is formed with plate members, the radiator grill 13 is able to protect the radiator 12 by shielding the radiator 12 from flying debris from outside of the work vehicle 1. Moreover, an opening ratio can be improved in comparison to a case in which a plurality of circular through-holes are provided since the through-holes 31 with the above shape are disposed in an alternating manner.

For example, the opening ratio of the radiator grill 13 in the present embodiment is larger due to the surface area of the interconnecting part 34 than a case in which the same number of circular through-holes are provided as the circular parts 32 and 33 of the through-holes 31 in the radiator grill 13 of the present embodiment. Therefore, the opening ratio can be increased while suppressing a reduction in stiffness in the radiator grill 13 according to the present embodiment. Accordingly, the radiator grill 13 according to the present embodiment is able to realize a high opening ratio and a good radiator protective ability.

In particular, since the first circular part 32 or the second circular part 33 of one of the through-holes 31 among a pair of through-holes 31 adjacent to each other in the second direction (x), overlaps a tangent line that is parallel to the first direction (y) and that touches (tangent to) the pair of circular parts 32 and 33 of another through-hole 31, the plurality of through-holes 31 are disposed closely. Accordingly, the opening ratio can be further improved.

The radiator grill 13 has the first guide plates 55 that are inclined with respect to the normal direction (z) of the first plate member 17. In this case, the flow of air that passes through the through-holes 31 is guided by the first guide plates 55. In particular, since the first guide plates 55 are inclined diagonally upward, air blown to the outside of the work vehicle 1 from the through-holes 31 is able to be guided upward diagonally. As a result, shielding of the air flow from the through-holes 31 due to the blade positioned in front of the radiator grill 13 is suppressed, and as a result, the volume of air blown out from the through-holes 31 can be increased.

Although an embodiment of the present invention has been described so far, the present invention is not limited to the above embodiments and various modifications may be made within the scope of the invention.

While the first direction is the vertical direction (y) and the second direction is the horizontal direction (x) in the above embodiment, the first direction and the second direction are not limited to these directions. For example, the first direction may be the horizontal direction (x) and the second direction may be the vertical direction (y). Alternatively, the first direction and the second direction may be directions that are inclined with respect to the vertical direction (y) and the horizontal direction (x).

While the radiator grill 13 is divided into the first radiator grill 14 and the second radiator grill 15 in the above embodiment, an integrated radiator grill may be provided.

The first circular part 32 or the second circular part 33 of one of the through-holes 31 among a pair of through-holes 31 adjacent to each other in the second direction (x) may not overlap the tangent line that is parallel to the first direction (y) and that touches (tangent to) the pair of circular parts 32 and 33 of the other through-hole 31.

The work vehicle is not limited to a bulldozer, and may be another type of work vehicle such as a wheel loader, a hydraulic excavator, or a motor grader. The radiator grill 13 is not limited to the front surface of the vehicle body and may be disposed in another position. For example, when the radiator 12 is disposed in the rear part of the vehicle body, the radiator grill 13 may be disposed on the back surface of the vehicle body.

The first guide plates 55 are not limited to being inclined upward and may be inclined in another direction. Alternatively, the first guide plates 55 may be omitted.

INDUSTRIAL APPLICABILITY

According to the illustrated embodiment, a radiator grill having a high opening ratio and a good radiator protective ability may be provided.

What is claimed is:

1. A radiator grill mounted on a work vehicle, the radiator grill comprising:
a frame; and
a plate member supported by the frame and having a plurality of through-holes aligned in a first direction and a second direction orthogonal to the first direction,
wherein,
each of the through-holes has
a pair of circular parts aligned in the first direction, and
an interconnecting part having a width in the second direction that is smaller than diameters of the circular parts, the interconnecting part interconnecting the circular parts, and the through-holes are disposed alternately so that one of the circular parts of one of two adjacent ones of the through-holes adjacent to each other in the second direction is aligned with the interconnecting part of the other of the two adjacent ones of the through-holes in the second direction.

2. The radiator grill according to claim 1, further comprising
a guide plate disposed facing a back surface of the plate member, the guide plate extending in the second direction, the guide plate being inclined with respect to a normal direction of the plate member.

3. The radiator grill according to claim 1, wherein
the one of the circular parts of the one of the two adjacent ones of the through-holes adjacent to each other in the second direction overlaps a tangent line that is parallel to the first direction and tangent to the circular parts of the other one of the two adjacent ones of the through-holes.

4. A work vehicle comprising the radiator grill according to claim 1.

* * * * *